F. LOTTER.
CULTIVATOR BLADE.
APPLICATION FILED SEPT. 11, 1913.
1,103,595.  Patented July 14, 1914.
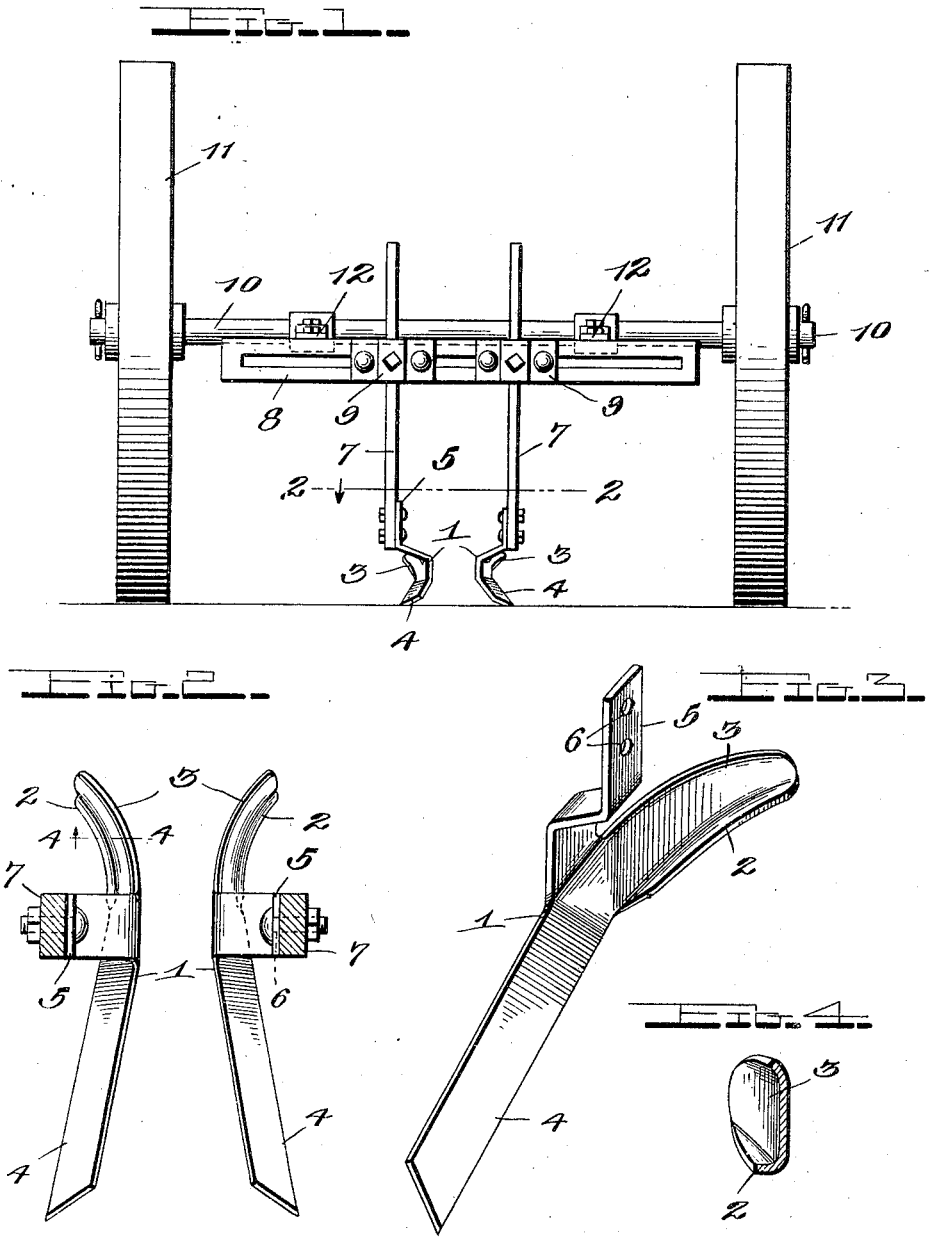
Witnesses
Chas. L. Griebauer.
Inventor
F. Lotter,
By H. D. Wilson & Co.
Attorneys

UNITED STATES PATENT OFFICE.

FRANKLIN LOTTER, OF ELKTON, MICHIGAN.

CULTIVATOR-BLADE.

1,103,595.  Specification of Letters Patent.  Patented July 14, 1914.

Application filed September 11, 1913. Serial No. 789,253.

*To all whom it may concern:*

Be it known that I, FRANKLIN LOTTER, a citizen of the United States, residing at Elkton, in the county of Huron and State of Michigan, have invented certain new and useful Improvements in Cultivator-Blades; and I do declare the following to be a full, clear, and exact description of the invention, such as will enable others skilled in the art to which it appertains to make and use the same.

This invention relates to improvements in cultivator blades or knives.

One object of the invention is to provide a cultivator blade or knife by means of which the soil may be cultivated close up to the plants without danger of cutting the stalks or roots thereof.

Another object is to provide a blade of this character which will be strong and durable in construction, efficient in operation and which may be applied to any cultivator.

With these and other objects in view, the invention consists of certain novel features of construction, combination and arrangement of parts as will be more fully described and claimed In the accompanying drawings: Figure 1 is a rear view of a portion of a cultivator showing my improved blades applied thereto; Fig. 2 is a horizontal sectional view taken on the line 2—2 of Fig. 1 and showing a top plan view of the blades in their relative positions with respect to the row of plants; Fig. 3 is a perspective view of one of the blades; Fig. 4 is a vertical cross sectional view of the front end or gathering member of the blade.

My improved cultivator blade comprises a plant gathering member 1 which tapers slightly toward its forward end and has its forward extremity rounded. The member 1 curves upwardly and outwardly toward its forward end and the edges of said member are turned outwardly as shown at 2 and 3 whereby said edges are prevented from cutting the stalks of the plants when brought into engagement therewith.

At the inner or rear end of the gathering member 1 is formed a long rearwardly extending knife or cutting member 4 which is set at an angle or inclination so that the lower edge thereof which inclines outwardly and downwardly will come into engagement with weeds growing along the sides of the rows of the plants thus severing and destroying the weeds The knife or cutting member flares outwardly or diverges from its inner connected end toward its free outer end so that as the blade is drawn along, the weeds will be cut out for a considerable distance beyond the sides of the rows of plants as well as close up to the same.

Formed integral with the blades at the inner ends of juncture of the gathering and cutting members thereof is an upwardly projecting right-angularly formed attaching shank 5 having in its upper portion bolt holes 6 whereby the blade is secured to a standard 7 by means of which the blade is attached to and supported in position on the frame of the cultivator.

In using my improved cultivator blades one of the same is disposed on each side of the row of plants to be cultivated and said blades are adjustably supported in this position on the frame of the cultivator by the standards 7 which may be attached to the cultivator frame in any suitable manner and which in the present instance are shown as being secured to a horizontally disposed slotted supporting bar 8 by clips 9 which are adjustably bolted to the bar 8 through the slot therein whereby the clips may be shifted laterally for fastening the shanks and thus holding the blades at the desired distance apart on opposite sides of the row of plants. The bar 8 may be attached to the frame of the cultivator in any suitable manner and is here shown as being attached to the axle 10 of the cultivator wheels 11 by means of links or hangers 12.

By thus constructing and arranging my improved blades, it will be seen that the plants in the rows will be gathered and drawn together by the gathering members 1 of the blade so that as the blades are drawn along, the gathered plants will pass between the inner surfaces of the gathering members and knife and will thus be prevented from being cut-off by the sharp outwardly turned lower edges of the cutting members which will sever the weeds close up to and for a considerable distance from the opposite sides of the rows of plants as hereinbefore described. The outwardly turned lower edges of the gathering members 1 on the front ends of the blades prevents these edges from cutting the stalks of the plants even though these rounded edges are brought into direct contact with the plants, and they have a tendency to force the plant roots more firmly into the ground. By adjustably supporting the blades in the manner described, the distance between the same may be regulated to correspond with the size of the plants being cultivated or the width of the rows so that any danger of the plants being injured by crowding between the blades will be obviated.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

Having thus described my invention, what I claim is:

1. A cultivator blade having an outwardly turned gathering member at its front end and an outwardly diverging cutting member at its rear end, said cutting member having its lower edge sharpened and being formed at an angle to bring said sharpened lower cutting edge into engagement with weeds growing close to and at a distance from the rows of plants.

2. A cultivator blade comprising an upwardly curved outwardly flared gathering member having its upper and lower edges turned outwardly, an angularly disposed cutting member extending longitudinally from the rear end of said gathering member and having a lower outwardly projecting cutting edge, and an attaching shank formed on said blade.

3. A cultivator blade comprising an upwardly curved outwardly flared gathering member having its upper and lower edges turned outwardly, an angularly disposed rearwardly projecting diverging cutting member having a lower outwardly projecting cutting edge, and a standard secured to said shank.

In testimony whereof I have hereunto set my hand in presence of two subscribing witnesses.

FRANKLIN LOTTER.

Witnesses:
W. L. DOYLE,
F. E. DOYLE.

---

Copies of this patent may be obtained for five cents each, by addressing the "Commissioner of Patents, Washington, D. C."